United States Patent [19]

Tseng et al.

[11] Patent Number: 5,350,631
[45] Date of Patent: Sep. 27, 1994

[54] WATER-BORNE LOW ADHESION BACKSIZE AND RELEASE COATING COMPOSITIONS, METHODS OF MAKING THE COMPOSITIONS, AND SHEET MATERIALS COATED THEREWITH

[75] Inventors: Chi-Ming Tseng; Steven S. Kantner, both of St. Paul, Minn.

[73] Assignee: Minnesota Mining and Manufacturing Company, St. Paul, Minn.

[21] Appl. No.: 86,323

[22] Filed: Jul. 1, 1993

Related U.S. Application Data

[60] Division of Ser. No. 732,727, Jul. 18, 1991, Pat. No. 5,225,480, which is a continuation of Ser. No. 496,598, Mar. 21, 1990, abandoned.

[51] Int. Cl.$^5$ ............................................. B05D 3/02
[52] U.S. Cl. .................................. 428/343; 428/522; 427/372.2; 427/385.5
[58] Field of Search ............................ 427/372.2, 385.5; 428/343, 522

[56] References Cited

U.S. PATENT DOCUMENTS 4,299,741 11/1981 Doehnert ............................ 524/365
5,093,414 3/1992 Rauterkus et al. .................. 524/813

*Primary Examiner*—Joseph L. Schofer
*Assistant Examiner*—Jeffrey T. Smith
*Attorney, Agent, or Firm*—Gary L. Griswold; Walter N. Kirn; Janice L. Dowdall

[57] ABSTRACT

A water-borne low adhesion backsize and release coating latex composition comprising: (a) about 5 to about 70 weight percent of a polymer comprising polymerized free radically polymerizable monomer of the formula $C_nH_{2n+1}-Y-C_mH_{2m}-X-CR^1=CH_2$ wherein n is an integer of about 12 to about 20, Y is a divalent polar linking group, X is a divalent linking group selected from the group consisting of

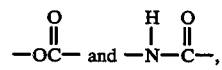

m is an integer of about 2 to about 10, and $R^1$ is selected from the group consisting of —H and —CH$_3$, (b) about 30 to about 95 weight percent of an aqueous phase, and (c) about 0.05 to about 4 weight percent of an emulsifier, wherein particles of the polymer are stabilized by the emulsifier and dispersed within the aqueous phase. A method of making the latex and sheet materials coated therewith.

7 Claims, No Drawings

WATER-BORNE LOW ADHESION BACKSIZE AND RELEASE COATING COMPOSITIONS, METHODS OF MAKING THE COMPOSITIONS, AND SHEET MATERIALS COATED THEREWITH

This is a division of application Ser. No. 07/732,727 filed Jul. 18, 1991 now U.S. Pat. No. 5,225,480 which is a file wrapper continuation of application Ser. No. 07/496,598 filed Mar. 21, 1990 now abandoned.

TECHNICAL FIELD

This invention relates to water-borne low adhesion backsize and release coating compositions of the type employed in connection with normally tacky and pressure-sensitive adhesive tape. The invention also relates to a method of making the compositions and to adhesive-coated sheet materials provided with such coatings.

BACKGROUND OF THE INVENTION

Normally tacky and pressure sensitive adhesive (PSA) materials have been used for well over half a century. Products of this type, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants. In order to allow a roll of tape to be unwound without the undesirable transfer of adhesive to the tape backing, it is customary to provide the tape backing with a low adhesion backsize (LAB). Similarly, the release sheet or liner, to which the adhesive coated label is typically laminated, is supplied with a release coating to permit the easy removal of the liner from the label. This LAB or release coating is expected to reproducibly provide an appropriate level of release to the adhesive of interest, to not deleteriously affect the adhesive, and to be resistant to aging so that the release level remains relatively stable with time.

The *Handbook of Pressure Sensitive Adhesive Technology*, 2nd Ed., D. Satas Ed., Van Nostrand Reinhold, New York, 1989, Chapter 23, describes polymers which may be used as release agents for PSA tapes. Various polymers of lower critical surface tension such as silicones, fluorine-containing polymers, and long alkyl chain branched polymers are useful as release coatings. Long alkyl chain branched polymers are waxy compounds which can be used to prepare release coatings of medium release value which are especially desirable for PSA tapes. Many release coating patents describe the use of such long alkyl chain branched polymers. For example, Hendricks, U.S. Pat. No. 2,607,711 (1952) discloses the use of copolymers of alkyl acrylate and acrylic acid for tape release coatings. According to Hendricks alkyl acrylates having an alkyl side chain of 16-20 carbon atoms are the more suitable, with octadecyl acrylate being the preferred comonomer.

Examples of other long alkyl chain branched copolymers include stearyl methacrylate-acrylonitrile copolymer (U.S. Pat. No. 3,502,497); copolymers of stearyl acrylate or methacrylate with other monomers (U.S. Pat. No. 4,241,198); polyvinyl esters such as polyvinyl stearate, polyvinyl palmitate, polyvinyl arachidate, and polyvinyl behenate (U.S. Pat. No. 2,829,073); stearyl maleate-vinyl acetate copolymer (U.S. Pat. No. 3,285,771); polyvinyl stearate, polyvinyl laurate, copolymers of vinyl stearate with vinyl acetate and maleic anhydride, copolymers of octadecyl acrylate with other monomers (U.S. Pat. No. 2,913,355); polyethylene imines a cylated with higher fatty acids (U.S. Pat. No. 3,510,342); poly-N-acyl imine (U.S. Pat. No. 3,475,196); solution polymers of vinyl stearate, allyl stearate, or vinyl octadecyl ether with maleic anhydride (U.S. Pat. No. 2,876,894); N-stearyl polyacrylamide (U.S. Pat. No. 3,051,588); solution polymerized stearyl itaconate, monacetyl itaconate, and monobehenyl itaconate (U.S. Pat. No. 3,052,566); copolymers of N-substituted long straight chain alkyl maleamic acids and vinyl monomers (U.S. Pat. No. 3,342,625); and polyvinyl N-octadecyl carbamate prepared by reacting polyvinyl alcohol and octadecyl isocyanate (U.S. Pat. No. 2,532,011).

Takaji, European Patent Application 80302935.4, Publication Number 0,024,908, Publication date Mar. 11, 1981, discloses polymeric release agents prepared via an organic solvent based polymerization of a vinyl monomer of the general formula $CH_2=CR^1COO(CH_2CHR^2O)_n CONHR$, wherein $R^1$ and $R^2$ each represent a hydrogen or methyl group, R represents an alkyl group of at least 12 carbon atoms or a fluoroalkyl group of at least 6 carbon atoms, and n is an integer of 1 to 6. European Patent Application 80302935.4 also discusses the polymerization of the vinyl monomer with other vinyl compounds. However, European Patent Application 80302935.4 does not teach or suggest the preparation of water-borne LABs or release coatings from such monomers.

All of the long-chain branched polymers discussed above are solvent-based polymers. They are prepared via polymerization reactions which are conducted in organic solvents and are typically coated out as dilute solutions, e.g., 1–10 percent, in the organic solvents in order to provide thin release coating layers on suitable backings. The use of such solvent-based release coatings in the manufacture of PSA tapes and other products poses both fire hazards and health hazards, in addition to being uneconomical, due to the organic solvents which constitute a large proportion of the coating solutions (i.e., generally greater than 90 weight percent). These organic solvents are typically either emitted into the air or burned in emission control devices. This is quite undesirable from the standpoint of environmental protection and energy conservation. An urgent need therefore exists for water-borne LABs and release coatings which can be prepared via aqueous polymerization reactions which can be coated onto suitable substrates as aqueous solutions or dispersions.

As indicated above, solvent-borne release coatings and LABs pose severe risks to the environment and are also uneconomical. Attempts have been made to overcome the problems associated with solvent-borne release coatings and LABs by the development of water-borne release coatings and LABs.

Collins, Great Britain Patent Specification 859,739 (published Jan. 25, 1961) discusses a backsize coating composition in the form of a substantially homogeneous and relatively stable aqueous dispersion adapted to be applied to a backing to form a thin coating which comprises a water-dispersible film former agent and a lesser amount of a water-insoluble water-dispersible release agent. The release agent which is incompatible with the film-former agent comprises either a fatty alcohol ester copolymer or fatty acid ester copolymer. Examples of the release agent include stearyl maleate-vinyl acetate copolymers and octadecyl acrylate-acrylic acid copolymers. The release agents are prepared by mixing the copolymers which are prepared and contained within organic solvents with isopropanol, water, and morpholine followed by distillation in order to remove the organic solvents. Thus, this approach is not a solvent-free process. In addition, the backsize coatings thus obtained do not provide good release properties for more aggressive pressure sensitive adhesives.

Dahlquist and Zenk, Great Britain Patent Specification 870022 (published Jun. 7, 1961) describes a pressure sensitive adhesive tape having a low adhesion backsize comprising a tetrapolymer of octadecyl acrylate, acrylic acid, acrylonitrile, and methyl acrylate in the approximate proportions by weight of 5:1:3:1. The tetrapolymer is obtained by the polymerization of the monomers in one or more organic solvents. Luedke, Dahlquist, and Hendricks, U.S. Pat. No. 3,011,988 (issued Dec. 5, 1961) discloses a method of converting such a tetrapolymer solution into an aqueous dispersion. The method involves the addition of water and morpholine to an organic solvent solution of the tetrapolymer followed by the removal of the organic solvent by distillation. Likewise, this approach is not a solvent-free process.

Doehnert, U.S. Pat. No. 4,299,741 (issued Nov. 10, 1981) discloses an aqueous release backsize coating composition for use in conjunction with pressure sensitive adhesive tapes. The coating composition comprises an acrylate terpolymer useful as a release polymer, a base, a polar solvent wetting agent, and a water-soluble thickening agent. The release polymer is obtained by the polymerization of a higher alkyl acrylate ester monomer, a carboxyl supplying monomer, and an acrylate derived hardening monomer in an organic solvent. A preferred acrylic ester is stearyl methacrylate. The aqueous backsize composition is prepared by adding a base to a solution of the terpolymer in an organic solvent, followed by the addition of a thickener and an aqueous solvent mixture. Again, this approach is not a solvent-free process. Furthermore, the backsize coatings prepared thereby do not provide the desired release or unwind properties for more aggressive pressure sensitive adhesives.

Wempe, U.S. Pat. No. 4,386,183 (issued May 31, 1983) and Wempe U.S. Pat. No. 4,440,830 (issued Apr. 3, 1984) disclose a polyvinyl alcohol based release coating composition for strippable substrates which is useful in conjunction with pressure sensitive adhesives. The release coating composition comprises a polyvinyl alcohol, a migratable release promoting agent, a water-soluble salt of a coordinating metal, and a water-soluble boron compound in an aqueous solution. According to Wempe the migratable release promoting agent may be any surface active agent exhibiting release promoting properties and surface activity in water and having a hydrophilic region which tends to bury itself in the water mass. Coatings formed from such compositions do not provide the desired release and aging properties for more aggressive pressure sensitive adhesives.

Thus, most existing polymer systems useful as LABs and release coatings which are described in the literature are solvent-based systems. However, due to safety, economical, and environmental concerns, solvent-free water-borne LAB and release coating systems are highly desirable. The so-called "aqueous release coating systems" described in the literature are mostly aqueous dispersions converted from solvent-based polymer systems and thus are not truly solvent-free polymer systems. In addition, such converted polymer systems do not provide desirable release and aging properties for more aggressive pressure sensitive adhesives. Other coating systems such as those that use surfactants as migratable release agents are also disadvantageous in that they do not provide desirable release and aging properties.

Attempts have been made at preparing aqueous-based dispersions of long alkyl chain branched polymers by the emulsion polymerization of monomer systems comprising long alkyl chain vinyl monomers such as octadecyl acrylate, stearyl methacrylate, vinyl stearate, etc. However, because of the relatively low reactivity of these long alkyl chain monomers as compared to short alkyl chain vinyl monomers in aqueous systems, difficulties have been encountered in attempting to incorporate these long alkyl chain vinyl monomers into a polymer structure. Thus, the polymer dispersions or emulsions prepared via such methods do not provide desirable release and aging properties. So far, there has been no successful development of a water-borne release coating system. An urgent need therefore exists for a water-borne release coating system which is environmentally safe and economical and which provides desirable release and aging properties.

BRIEF DESCRIPTION OF THE INVENTION

We have discovered a novel water-borne release coating system comprising a polymer latex prepared by the emulsion polymerization of certain specific long-chain monomers. The polymers are prepared via an aqueous emulsion polymerization of monomer systems comprising these specific long-chain monomers. The polymerization process is an entirely solvent-free process. The polymer latex thus formed can be diluted, if necessary, with water in order to obtain the desired polymer concentration and coated onto a substrate without the use of any organic solvent. The release coatings and LABs thus obtained possess excellent release and aging properties for a variety of conventional pressure sensitive adhesives including aggressive pressure sensitive adhesives.

A first aspect of the present invention relates to a latex comprising:
(a) about 5 to about 70 weight percent of a polymer comprising polymerized free-radically polymerizable monomer wherein the free radically polymerizable monomer comprises long-chain monomer of the formula

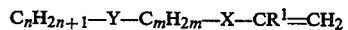

$$C_nH_{2n+1}-Y-C_mH_{2m}-X-CR^1=CH_2$$

wherein
n is an integer of about 12 to about 20;
Y is a divalent polar linking group;
X is a divalent linking group selected from the group consisting of

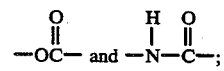

$$-\overset{O}{\underset{\|}{O}}C- \text{ and } -\overset{H}{\underset{|}{N}}-\overset{O}{\underset{\|}{C}}-;$$

m is an integer of about 2 to about 10; and
$R^1$ is selected from the group consisting of —H and —CH$_3$;

(b) about 30 to about 95 weight percent of an aqueous phase; and (c) about 0.05 to about 4 weight percent of an emulsifier;

wherein particles of the polymer are stabilized by the emulsifier and dispersed within the aqueous phase.

A second aspect of the present invention relates to a method of preparing the latex which comprises the steps of:

a) forming a mixture comprising the following:
  (1) about 5 to about 70 weight percent of a melted free radically polymerizable monomer charge wherein the monomer charge comprises free radically polymerizable long-chain monomer of the formula $$C_nH_{2n+1}-Y-C_mH_{2m}-X-CR^1=CH_2$$

wherein
  n is an integer of about 12 to about 20;
  Y is a divalent polar linking group;
  X is a divalent linking group selected from the group consisting of

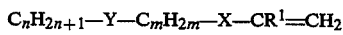

m is an integer of about 2 to about 10; and
  $R^1$ is selected from the group consisting of —H and —$CH_3$;
  (2) about 30 to about 95 weight percent of an aqueous phase; and
  (3) about 0.05 to about 4 weight percent of an emulsifier;

b) homogenizing the mixture in order to form an emulsion;

c) adding to the emulsion about 0.01 to about 1 weight percent of a free radical initiator capable of initiating free radical polymerization of the monomer upon being subjected to a means of initiation;

d) initiating free-radical polymerization by subjecting said emulsion to a means of initiation while agitating the emulsion under inert atmospheric conditions; and e) sustaining the free-radical polymerization until a polymer-containing latex is produced.

Yet another aspect of the invention relates to a coated sheet material comprising a flexible sheet and a release coating covering at least a portion of one major surface of the flexible sheet wherein the release coating is formed by coating the above described latex which has been diluted if necessary onto the flexible sheet and allowing the coating to dry. The coating thus obtained possesses excellent release and aging properties even against aggressive pressure sensitive adhesives.

DETAILED DESCRIPTION OF THE INVENTION

I. Water-borne LAB and Release Coating Compositions and Emulsion Polymerization Method of the Present Invention As indicated above, the latex of the present invention comprises a polymer dispersed within an aqueous phase which is stabilized by an emulsifier. The latex, which is useful as water-borne LABs and release coatings, is formed by the emulsion polymerization or copolymerization of certain long-chain monomers.

I.A. Long-Chain Monomers

The long-chain monomers useful in forming the water-borne LAB and release coating polymer latex of the invention have the following general structure

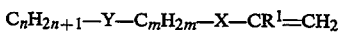

wherein n, Y, X, m, and $R^1$ are as previously defined.

As indicated above, n is an integer ranging from about 12 to about 20. Preferably, n is an integer ranging from about 12 to about 18. If n is greater than 20, the melting points of both the monomer and the polymer prepared therefrom become too high resulting in difficulties in both the polymerization of the monomer and in the subsequent coating of the polymer. If n is less than 12, the alkyl chain of the long-chain monomer does not crystallize at room temperature and consequently the long-chain monomer does not contribute to the release properties of the polymer prepared therefrom.

As indicated previously, m is an integer of about 2 to about 10. Preferably, m is an integer of about 2 to about 4.

Preferably, the divalent polar linking group Y is selected from the group consisting of

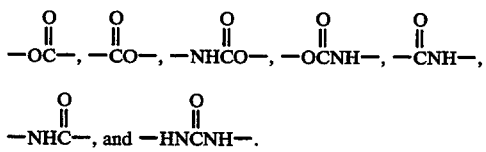

These divalent polar linking groups provide a degree of hydrophilicity to the monomer and, in addition, improve adhesion of the polymer coating to a suitable substrate. Most preferably, the divalent polar linking group Y is selected from the group consisting of

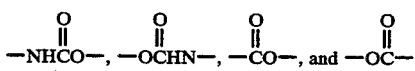

due to the balance in terms of melting point and overall release properties of polymers formed from long-chain monomers containing such divalent polar linking groups.

The group comprising polar linking group P and the short alkylene group $C_mH_{2m}$ serves as a spacer group in the long-chain monomer compound. The spacer group isolates the —X—$CR^1$=$CH_2$ group from the crystallizable chain $C_nH_{2n+1}$ and imparts a degree of hydrophilicity to the long-chain monomer compound.

The long-chain monomer compound which can be used in forming the latex of the present invention polymerizes and copolymerizes better than ordinary long-chain monomers such as octadecyl acrylate, stearyl methacrylate, vinyl stearate, etc., with itself and other vinyl monomers during emulsion polymerization.

Typical examples of the long-chain monomers useful in the water-borne LAB and release coating systems of the invention include, but are not limited to, the following:

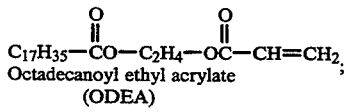
Octadecanoyl ethyl acrylate
(ODEA)

-continued

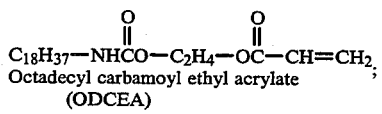
Octadecyl carbamoyl ethyl acrylate
(ODCEA)

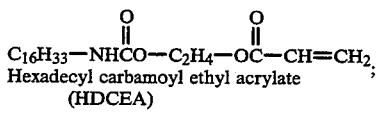
Hexadecyl carbamoyl ethyl acrylate
(HDCEA)

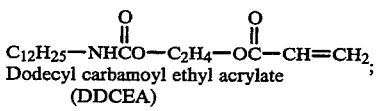
Dodecyl carbamoyl ethyl acrylate
(DDCEA)

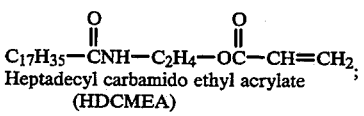
Heptadecyl carbamido ethyl acrylate
(HDCMEA)

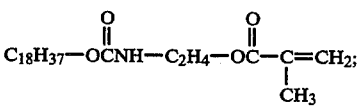
Octadecyl N-ethyl methacrylate carbamate
(ODEMAC)

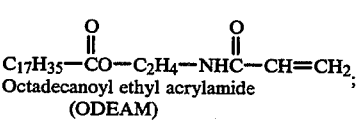
Octadecanoyl ethyl acrylamide
(ODEAM)

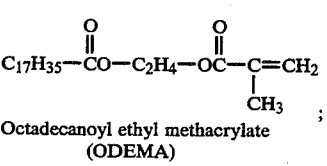
Octadecanoyl ethyl methacrylate
(ODEMA)

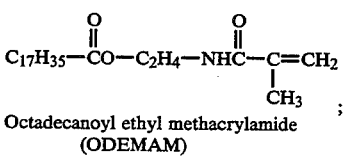
Octadecanoyl ethyl methacrylamide
(ODEMAM)

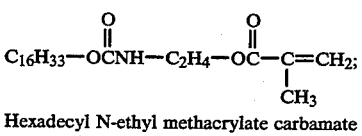
Hexadecyl N-ethyl methacrylate carbamate
(HDEMAC)

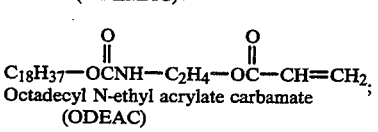
Octadecyl N-ethyl acrylate carbamate
(ODEAC)

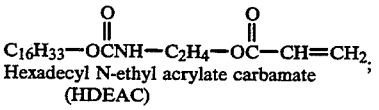
Hexadecyl N-ethyl acrylate carbamate
(HDEAC)

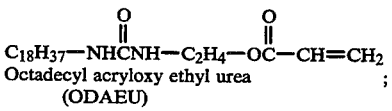
Octadecyl acryloxy ethyl urea
(ODAEU)

and mixtures thereof.

Preferably, the long-chain monomers used in preparing the latex of the present invention are selected from the group consisting of ODCEA, HDCEA, ODEA, and mixtures thereof due to the monomers' mid-range melting points which facilitate handling, the film-forming properties of the polymer latexes prepared therefrom, and the overall release properties obtained from coatings produced therefrom.

The combination of two long-chain monomers of different types or of the same type but different chain lengths may be desirable in some cases to afford optimal properties such as film forming and release properties. These long-chain monomers may be polymerized alone or copolymerized in combination with at least one free radically polymerizable second monomer different than the long-chain monomers. The second monomers generally improve the film forming properties of the polymer latex and also reduce the cost of the product.

I.B. Second Monomers

As indicated above, the long-chain monomers may optionally be polymerized with one or more suitable second monomers. The term "second monomer" as used herein refers to a monomer containing at least one free-radically polymerizable double bond which does not contain an alkyl chain or which contains an alkyl chain comprising less than about 12 carbon atoms. Thus, the second monomer comprises monomer selected from the group consisting of free-radically polymerizable monomers which do not contain an alkyl chain and free radically polymerizable monomers which contains an alkyl chain containing less than about 12 carbon atoms. Examples of such second monomers include but are not limited to the following: vinyl halides such as vinylidene chloride, etc.; vinyl ethers such as vinyl propyl ether, vinyl butyl ether, etc.; vinyl esters such as vinyl acetate, vinyl propionate, vinyl butyrate, vinyl benzoate, etc.; acrylic esters such as methyl acrylate, ethyl acrylate, isobornyl acrylate, tetrahydrofurfuryl acrylate, hydroxyethyl acrylate, glycidyl acrylate, etc.; methacrylic esters such as ethyl methacrylate, butyl methacrylate, hexyl methacrylate, tetrahydrofurfuryl methacrylate, hydroxyethyl methacrylate, glycidyl methacrylate, etc.; acids such as acrylic acid, methacrylic acid, etc.; amides such as acrylamide, methacrylamide, etc.; aromatic vinyl compounds such as styrene, vinyl toluene, etc.; heterocylic vinyl monomers such as vinyl pyrrolidone, vinyl pyridine, etc.; vinyl nitriles such as acrylonitrile, methacrylonitrile, etc.; allyl compounds such as allyl glycidyl ether, etc.; esters and half-esters of diacids such as diethyl maleate, monomethyl itaconate, monobutyl itaconate, etc.; and mixtures thereof.

Preferably, the second monomer utilized is selected from the group consisting of vinyl acetate, vinyl propionate, methyl acrylate, butyl methacrylate, hydroxyethyl acrylate, methacrylic acid, glycidyl methacrylate, and mixtures thereof. Most preferably, the second monomer utilized is selected from the group consisting of vinyl acetate, vinyl propionate, and mixtures thereof, due to their relatively low reactivities which facilitate copolymerization with the long-chain monomers.

The long-chain monomer/second monomer composition should be chosen in order to provide a proper hydrophilic-hydrophobic balance and a proper match of reactivity ratios, thus affording a polymer structure which possesses good film-forming properties, release properties, ink receptivity, etc. If the ratio of long-chain monomer to second monomer is too high the film forming properties of the polymer latex begin to deteriorate.

If the ratio of long-chain monomer to second monomer is too low the release properties of the polymer latex coating begin to deteriorate.

The ratio of the long-chain monomer to the second monomer can range from about 20:80 to about 100:0 depending upon the type of PSA to be used in conjunction with the water-borne LAB or release coating and the tightness of the release desired. Preferably, the ratio of the long-chain hydrocarbon monomer to the second monomer ranges from about 40:60 to about 60:40 in order to provide good release properties when used in conjunction with an acrylic PSA and in order to provide good film-forming properties.

I.C. Emulsifiers

Emulsifiers useful in conventional emulsion polymerizations, including the categories of anionic, nonionic, amphoteric, and cationic emulsifiers, may be used in the emulsion polymerization of the water-borne LAB and release coating systems of the present invention.

Useful anionic emulsifiers include but are not limited to the following: fatty acid soaps, alkylary sulfonates, diphenyl sulfonate derivatives, fatty acid isethionates, fatty acid taurates, olefin sulfonates, phosphate esters, sarcosin derivatives, sulfates and sulfonates of ethoxylated alkylphenols, sulfates and sulfonates of oils and fatty acids, sulfates of fatty alcohols, sulfates and sulfonates of ethoxylated fatty alcohols, sulfates of fatty esters, sulfosuccinates and derivatives, carboxylated alcohol ethoxylates, perfluoroalkyl sulfonates, perfluoroalkyl carboxylates, and mixtures thereof.

Useful nonionic emulsifiers include but are not limited to the following: ethoxylated fatty alcohols, ethoxylated alkylphenols, ethoxylated fatty acids, ethoxylated fatty esters, sorbitan derivatives, sucrose esters and derivatives, ethylene oxide-propylene oxide block copolymers, fluorinated alkyl polyoxyethylene ethanols, and mixtures thereof.

Useful cationic emulsifiers include but are not limited to the following: long-chain amines and their salts, quarternary ammonium salts, ethoxylated amines, and mixtures thereof.

Useful amphoteric emulsifiers include but are not limited to the following: betaine derivatives, sulfobetaine derivatives, N-fatty aminopropionate, N-fatty aminobutyrate, alkyl imidazoline, and mixtures thereof.

In general, ionic emulsifiers such as anionic emulsifiers, cationic emulsifiers, and amphoteric emulsifers are preferred over the nonionic emulsifiers due to the electrostatic stabilization mechanism imparted by the ionic emulsifiers which serves to provide better colloidal stability. Anionic, cationic and amphoteric emulsifiers can each be separately combined with a nonionic emulsifier in order to form quite useful emulsifier combinations. Particularly useful emulsifiers are those containing both anionic and nonionic moieties such as sulfates and sulfonates of ethoxylated alkylphenols, sulfates and sulfonates of ethoxylated fatty alcohols, phosphate esters of ethoxylated alkylphenols, and carboxylated alcohol ethoxylates.

Within each category of emulsifier, the hydrophilic-lyophilic balance (HLB) value of each emulsifier can be used as a guide for choosing a proper emulsifier or emulsifier combination for a particular monomer composition. In general, an emulsifier possessing an HLB value greater than about 8 is appropriate for preparing the emulsion latex of the present invention.

I.D. Initiators

Initiators useful in the emulsion polymerization method of the present invention are well known to practitioners skilled in the art and are detailed in *Emulsion Polymerization*, D. C. Blackley, Chapter 6, Applied Science Publishers Ltd., 1975, London. Preferably, the initiator utilized is a water-soluble initiator. It is conventional to subdivide initiators into two broad classes: (a) dissociative initiators and (b) redox initiators. Dissociative initiators are those which function by simple dissociation of a molecule or an ion into two radical species from which species initiation can then take place. Redox initiators are initiator systems which comprise two or more substances whose mutual interactions produce free radicals which are capable of initiating polymerization.

The most important dissociative initiators are inorganic salts of persulfuric acid such as potassium persulfate, sodium persulfate, and ammonium persulfate. Other useful dissociative initiators for use in emulsion polymerizations include but are not limited to aromatic diazoamino compounds, aromatic diazothio ethers, alkali-metal aryl diazoates, water-soluble analogues of azobisisobutyronitrile such as 4,4'-azobis-(4-cyanopentanoic acid) and its alkali-metal salts, 2,2'-azobis-(2-cyanopropane-1-sulfonate), 2,2'-azobis-(2-amidinopropane)dihydrochloride, $\alpha,\alpha'$-azobis-butyramidinium chloride, and azobis-(N,N'-dimethylene isobutyramidine) and its salts with strong acids.

Useful redox initiator systems include but are not limited to persulfate-mercaptan systems, persulfate-sulfite systems, chlorate-bisulfite systems, hydrogen peroxide-iron systems, hydroperoxide-iron systems, dibenzoyl peroxide-iron pyrophosphate systems, and hydroperoxide-polyamine systems.

I.E. pH Buffers

Depending upon the monomer composition, the type of emulsifier, and the type of initiator selected, it may be desirable to maintain the pH of the emulsion polymerization system within a certain range. For example, when a persulfate initiator and an anionic emulsifier are used, a pH greater than about 5 is desired for better colloidal stability. Thus, a pH buffer can optionally be included in the emulsion polymerization system. Examples of useful pH buffers include sodium bicarbonate, sodium hydrogen phosphate, and the like.

I.F. Emulsion Polymerization Method of the Present Invention

Another aspect of the present invention relates to a method of carrying out the emulsion polymerization of the long-chain monomer described above. Most of the long-chain monomers useful according to the present invention exist in solid states at ambient temperature. The long-chain monomer can be charged into a suitable vessel and melted at a temperature higher than its melting point. The second monomer, if included, can be gradually added to the vessel containing the melted long-chain monomer in order to form a mixture during which time the mixture is kept in a molten state. Preferably, the long-chain monomer is charged, in a solid state, along with the second monomer, in a solid or liquid state, into a suitable vessel prior to melting. A vessel equipped with a reflux condenser may be used when the second monomer possesses a relatively low boiling point. The melting and mixing of the monomers can also be carried out in a vessel held under pressure. The remainder of the emulsion polymerization components including the aqueous phase (preferably deionized water), the emulsifier, and an optional pH buffer are typically mixed in a separate vessel in order to form an aqueous solution and then heated to a temperature equal to or higher than the temperature of the monomer mixture. The monomer mixture is then typically added to the aqueous solution following which the resultant mixture is homogenized.

Alternatively, the long-chain monomer can be charged in a solid state and the optional second monomer can be charged in a solid state or a liquid state, in any order, into a vessel already containing the aqueous solution, following which the vessel is heated in order to melt the monomer. The resultant mixture is then homogenized. According to either approach, gentle agitation may be applied during the heating process in order to facilitate the melting process.

Homogenization can be accomplished using a conventional homogenizer such as a Waring TM blender (available from Dynamics Corporation of America), a Manton-Gaulin TM homogenizer (available from Gaulin Corporation), a Microfluidizer TM homogenizer (available from Microfluidics Corporation), a colloid mill, a Sonifier TM homogenizer (available from Bronson Ultrasonics Corporation), a rotor-stator type homogenizer, etc. The emulsion thus obtained is a stable emulsion containing droplets of monomer or monomer mixture having a diameter on the order of about 0.1 to about 0.5 micrometer dispersed within the aqueous phase.

The emulsion is typically charged into a suitable reactor followed by the initiator although it is not necessary that they be charged in any particular order. To avoid inhibition by oxygen, the reactor is typically purged with an inert gas such as nitrogen before and after the emulsion is charged into the reactor. A conventional polymerization reactor equipped with an agitator and a condenser can be used in order to carry out the emulsion polymerization. In the laboratory, resin flasks and bottles heated in a water bath with proper agitation can also be used for this purpose.

Polymerization is then initiated by subjecting the emulsion to a means of initiation, typically by the application of heat. A suitable polymerization temperature typically falls within the range of about 50° C. to about 90° C. depending upon the type of initiator system and monomer composition utilized. It is desirable to maintain the polymerization temperature above the melting point or points of the long-chain monomer utilized so that a more homogeneous polymer composition is obtained. Polymerization times on the order of about 2 to about 20 hours is generally adequate, depending upon the initiator, monomer composition, and polymerization temperature utilized. The latex thus obtained comprises polymer particles having diameters on the order of about 0.1 to about 0.5 micrometer, stabilized by the emulsifier within the aqueous phase. The latex polymer thus obtained typically possesses a melting point or melting points above about 30° C., with at least one melting point in the range of about 50° C. to about 100° C., which contributes to good aging properties of the release coating.

The chart below sets forth useful and preferred component ranges for polymerization recipes useful for preparing the latex of the present invention.

| Components | Useful Wt % | Preferred Wt % |
| --- | --- | --- |
| Monomer Mixture Comprising Long-Chain Monomer and Optional Second Monomer | about 5–about 70 | about 5–about 50 |
| Ratio of Long-Chain Monomer to Second Monomer | about 20:80–about 100:0 | about 40:60–about 60:40 |
| Aqueous Phase | about 30–about 95 | about 50–about 95 |
| Emulsifier | about 0.05–about 4 | about 0.1–about 2 |
| Initiator | about 0.01–about 1 | about 0.05–about 0.5 |
| pH Buffer | about 0–about 0.5 | about 0–about 0.2 |

I.F. Additives

The latex prepared according to the method of the invention may be used alone as an LAB or release coating or alternatively it may be used in combination with one or more other latexes. The latex of the present invention may be combined with a composition selected from the group consisting of a solution of a water-soluble polymer, a dispersion of a water-dispersible polymer, a polymer latex, an inorganic colloidal dispersion, and mixtures thereof in order to improve rheological properties, film-forming properties, ink receptivity, etc. Any additive utilized should not be added to the latex in an amount which would interfere with the stability of the latex. In the case wherein the additive comprises a solution of a water soluble polymer the polymer is preferably selected from the group consisting of polyacrylic acid, polyvinylpyrrolidone, hydroxyethyl cellulose, and mixtures thereof.

I.G. Coated Sheet Materials

The latex of the present invention is typically best used as a coating for a solid substrate, which may be a sheet, a fiber, or a shaped object. However, the preferred substrates are those which are used for pressure-sensitive adhesive products. Suitable substrates include paper, metal sheets and foils, nonwoven fabrics, and films of thermoplastic resins such as polyesters, polyamides, polyolefins, polycarbonates, polyvinyl chloride, etc., although any surface requiring release toward adhesives can be used. Primers known in the art can be utilized to aid in the adhesion of the latex coating to the substrate, but they are not generally necessary.

The desired concentration of the latex coating depends upon the method of coating and upon the desired coating thickness. If necessary, a polymer latex of a higher percentage solids content obtained from the aforementioned emulsion polymerization process can be diluted with water to a lower concentration, e.g., about 2 to about 20 weight percent solids, preferably about 5 to about 20 weight percent solids in order to obtain a thinner coating of film.

The latex coating composition may be applied to a suitable substrate by means of conventional coating techniques such as wire-wound rod, direct gravure, offset gravure, reverse roll, air-knife, and trailing blade coating. The coating is typically dried at a temperature of at least about 5° C. above the highest melting point of the latex polymer in order to obtain a coating possessing good release properties. The resultant coatings provide effective release for a wide variety of conventional pressure-sensitive adhesives such as natural rubber-based, acrylic, and other synthetic film-forming elastomeric materials. The coating thus obtained is capable of providing a medium release, (i.e., about 10 to about 200 g/cm) against aggressive PSAs.

The present invention provides a roll of tape which includes a flexible backing member, a pressure-sensitive adhesive coating on one major surface of the backing member, and a release coating on the opposite major surface of the backing comprising the polymer defined above. The invention further provides a tape comprising a flexible backing member, a pressure-sensitive adhesive coating on one major surface of the backing member and a release liner comprising a flexible sheet coated over the major surface adhered to the pressure-sensitive coating with the copolymer defined above. The invention further provides a transfer tape comprising a film of pressure-sensitive adhesive between two release liners, at least one being coated with the latex.

The invention also provides a coated sheet material wherein the release agent is on one side of the sheet and the adhesive is on the other side. The invention further provides a coated sheet material wherein the adhesive is a normally tacky and pressure-sensitive adhesive. The invention also provides a stack of superimposed sheets of the coated sheet material, the pressure-sensitive adhesive on each sheet being in contact with the release agent on an immediately adjacent sheet.

The invention also provides a fanfolded web formed from the coated sheet material, the adhesive on each segment of the web being in contact with the release agent on an immediately adjacent segment. The invention also provides the coated sheet material wherein the adhesive is present in a band adjacent one edge of the sheet. The invention also provides a stack of individual sheets formed from the coated sheet material, the adhesive bands of adjacent sheets lying along opposite edges.

The invention further provides a coated sheet material having a release agent on one side and an adhesive on the other side wherein said coated sheet material can be wound convolutely on itself about a core to form a roll. The invention further provides the coated sheet material wherein the adhesive is a normally tacky pressure-sensitive adhesive.

The invention further provides a coated sheet material wherein the release agent covers a first portion of one side and a normal tacky and pressure-sensitive adhesive covers a second portion of the same side. The invention further provides a coated sheet material wherein the sheet is an elongate strip having spaced alternating areas of release agent and an adhesive. The invention also further provides the coated sheet material wherein the sheet is generally rectangular, the release agent being present in a band adjacent one edge and the pressure-sensitive adhesive being present in a band adjacent the opposite edge.

EXAMPLES

The following detailed description includes exemplary preparations of various long-chain monomers and latexes prepared therefrom. All parts and percentages in the Examples and the rest of the Specification are by weight unless otherwise specified. Also provided are the release and readhesion values obtained, both immediate and aged, upon coating a portion of the latex onto a flexible substrate, applying a piece of pressure-sensitive adhesive tape to the coated substrate, and subsequently removing the tape after certain elapsed times and conditions.

Example 1

ODEA/VAc (60:40)

Octadecanoyl ethyl acrylate (ODEA) monomer was prepared as follows. First, 30.3 grams (0.10 mole) of stearoyl chloride was gradually added to a 500 ml flask containing a solution comprising 11.6 grams (0.10 mole) of hydroxyethyl acrylate, 10.6 grams (0.105 mole) of triethyl amine, and 100 grams of toluene. The container contents were allowed to react overnight which resulted in the formation of a slurry. The resulting slurry was filtered to remove triethylamine-HCl salt. The filtrate was then vacuum stripped to yield 37 grams of ODEA monomer.

Next, 2.4 grams of ODEA monomer was dissolved in 1.6 grams of vinyl acetate (VAc) in a 50 ml beaker. The beaker contents were then added to a 250 ml stainless steel container containing a solution of 0.34 grams of Avanel S-90 (35% active) emulsifier (sodium alkyl polyether sulfonate, available from PPG Industries, Inc.) and 76 grams of deionized water. The mixture was homogenized with a Waring TM blender set at low speed for 2 minutes. The resulting emulsion was poured into a 120 ml glass bottle, following which 0.2 grams of potassium persulfate initiator and 0.2 grams of sodium bicarbonate buffer were added to the emulsion. After purging with nitrogen, the bottle was sealed and tumbled in a water bath held at 75° C. for 22 hours. This procedure resulted in a stable latex of 5% solid. A small latex sample was dried in a 57 mm diameter aluminum weigh dish under ambient conditions to 100% solid. The solid polymer thus obtained was evaluated using differential scanning calorimetry (DSC). Melting points of 41° C. and 54° C. were obtained.

The latex was evaluated as a water-borne LAB according to the following procedure. A small portion of the latex was applied to a 15 cm×25 cm strip of cellulose acetate film using a #3 Meyer bar. The coated cellulose acetate film was dried in an oven set at 80° C. for 2 minutes. After the coated film was cooled to room temperature, a 1.9 cm×25 cm strip of #810 Magic TM tape (an aggressive acrylic adhesive coated on a cellulose acetate backing available from 3M) was applied onto a 2.5 cm×25 cm strip of the coated film. The tape was then peeled from the coated film with a slip/peel tester set at a speed of 230 cm/min. in order to provide the initial release value. The peeled tape was then applied to a clean glass plate following which an additional peel test was performed in order to yield the initial readhesion value.

For the aged release and readhesion values, a 1.9 cm×25 cm size strip of #810 Magic TM tape was applied to a 2.5 cm×25 cm size strip of coated cellulose acetate film and placed in an oven set at 50° C. for 17 hours. After being cooled to room temperature, peel tests were conducted on the aged samples following the same procedures utilized in obtaining the initial release and readhesion values. Release and readhesion results are reported in Table I.

Initial release values of greater than 300 g/cm and aged release values of greater than 450 g/cm were obtained from blank tests wherein 1.9 cm×25 cm strips of #810 Magic TM tape were placed against cellulose acetate films without latex coatings.

Example 2

ODCEA/VAc (50:50)

Octadecyl carbamoyl ethyl acrylate (ODCEA) monomer was prepared as follows. First, 59.1 grams (0.2 mole) of octadecyl isocyanate was charged into a 500 ml flask containing a solution comprising 24.4 grams (0.21 mole) of hydroxyethyl acrylate, a trace amount of dibutyltin dilaurate catalyst, and 30 grams of ethyl acetate. The flask contents were allowed to react at 50° C. overnight. Upon cooling a precipitate formed which was then recrystallized from hot ethyl acetate and dried to provide 47 grams of ODCEA.

Next, 2.0 grams of ODCEA and 2.0 grams of vinyl acetate (VAc) were charged into a 120 ml glass bottle containing a solution comprising 0.24 gram of Avanel S-90 sodium alkyl polyether sulfonate (35% active) emulsifier and 76 grams of deionized water. The bottle was heated in a water bath held at 60° C. The mixture was then homogenized with a Waring TM blender set at a low speed for 2 minutes. The resulting emulsion was poured into a 120 ml glass bottle, following which 0.2 gram of potassium persulfate and 0.2 gram of sodium bicarbonate were added. After purging with nitrogen, the bottle was then sealed and tumbled in a water bath held at 75° C. for 17 hours. This procedure yielded a stable latex of 5% solid. A dried polymer sample was prepared and evaluated via DSC as in Example 1. Melting points of 40° C. and 60° C. were obtained.

I. A small portion of the latex was coated onto a cellulose acetate film, dried, and evaluated according to the procedure set forth in Example 1. Release and readhesion results are reported in Table I.

II. A small portion of the latex was also coated onto a piece of a rayon nonwoven substrate using a #3 Meyer bar which was subsequently dried in an 80° C. oven for 2 minutes. The coated substrate was evaluated against 2.5 cm wide Micropore TM surgical tape (an acrylic adhesive coated on a rayon nonwoven backing available from 3M) according to the procedure of Example 1. An initial release of 48 g/cm, an initial readhesion of 170 g/cm, an aged release of 91 g/cm, and an aged readhesion of 180 g/cm were obtained. In a blank test wherein 2.5 cm wide Micropore TM surgical tape was placed against a piece of rayon nonwoven substrate without a latex coating, an initial release of 100 g/cm, and an aged release of 180 g/cm were obtained.

Example 3

ODCEA/VAc (50:50)

Octadecyl carbamoyl ethyl acrylate (ODCEA) monomer was prepared according to the procedure of Example 2. Into a first 120 ml glass bottle was charged a mixture of 2.0 grams of ODCEA and 2.0 grams of vinyl acetate (VAc). Into a second 120 ml glass bottle was charged a solution comprising 0.24 gram of Avanel S-90 sodium alkyl polyether sulfonate (35% active) emulsifier and 76 grams of deionized water. Both bottles were heated in a water bath held at 70°-75° C. The contents from both bottles were then mixed together in a 250 ml container and homogenized in a Waring TM blender set at a low speed for 2 minutes. The resulting emulsion was poured into a 120 ml glass bottle. Next, 0.1 gram of potassium persulfate and 0.1 gram of sodium bicarbonate were added to the emulsion. After purging with nitrogen, the bottle was sealed and tumbled in a water bath held at 75° C. for 15-20 hours. This resulted in the formation of a stable latex containing 5% solids. A coating of the latex on a cellulose acetate film, which was dried at 80° C. for 2 minutes, was evaluated according to the procedure of Example 1. Release and readhesion values are reported in Table I.

Example 4

ODCEA/MA (50:50)

A latex containing 5% solids was prepared from a 50:50 wt. ratio of octadecyl carbamoyl ethyl acrylate (ODCEA) and methyl acrylate (MA) monomer following the same procedure as described in Example 3. A coating of the latex on a cellulose acetate film, which was dried at 80° C. for 2 minutes, was evaluated according to the procedure of Example 1. Release and readhesion values are reported in Table I.

Comparative Examples 1-3

Comparative Examples 1-3 involved the preparation of latex compositions from monomers not having the formula of the long-chain hydrocarbon monomers used in preparing the latex compositions of the present invention.

Comparative Example 1

ODA/VAc (50:50)

A latex containing 5% solids was prepared from a 50:50 wt. ratio of octadecyl acrylate (ODA) and vinyl acetate (VAc) monomer following the same procedure as described in Example 3. A coating of the latex on a cellulose acetate film was dried at 80° C. for 2 minutes and evaluated according to the procedure of Example 1. Release and readhesion values are reported in Table I.

Comparative Example 2

ODA/MA (50:50)

A latex containing 5% solids was prepared from a 50:50 wt. ratio of octadecyl acrylate (ODA) and methyl acrylate (MA) monomer following the same procedure as described in Example 3. A coating of the latex on a cellulose acetate film was dried at 80° C. for 2 minutes and evaluated according to the procedure of Example 1. Release and readhesion values are reported in Table I.

Comparative Example 3

ODA/MA/NA/AA (51:11:25:13)

A latex containing 5% solids was prepared from a 51:11:25:13 wt. ratio of octadecyl acrylate (ODA), methyl acrylate (MA), acrylonitrile (AN), and acrylic acid (AA) monomer following the same procedure as described in Example 3. A coating of the latex on a cellulose acetate film was dried at 80° C. for 2 minutes and evaluated according to the procedure of Example 1. Release and readhesion values are reported in Table I.

Example 5

HDCEA/VAc (50:50)

Hexadecyl carbamoyl ethyl acrylate (HDCEA) monomer was prepared following a procedure similar to the one used for preparing octadecyl carbamoyl ethyl acrylate (ODCEA) in Example 2 except that octadecyl isocyanate was replaced with an equal molar amount of hexadecyl isocyanate. A latex containing 5% solids was prepared from a 50:50 wt. ratio of HDCEA and vinyl acetate (VAc) monomer following the procedure described in Example 3. A dried polymer sample was prepared and evaluated via DSC as in Example 1. Melting points of 38° C. and 61° C. were obtained. A coating of the latex on a cellulose acetate film was dried at 80° C. for 2 minutes and evaluated according to the procedure of Example 1. Release and readhesion values are reported in Table I.

Example 6

ODCEA/HDCEA/VAc (40:10:50)

A latex containing 5% solids was prepared from a 40:10:50 wt. ratio of octadecyl carbamoyl ethyl acrylate (ODCEA), hexadecyl carbamoyl ethyl acrylate (HDCEA), and vinyl acetate (VAc) monomer following the same procedure as described in Example 3. A coating of the latex on a cellulose acetate film was dried at 80° C. for 2 minutes and evaluated according to the procedure of Example 1. Release and readhesion values are reported in Table I.

Example 7

HDCMEA/VAc (50:50)

Heptadecyl carbamido ethyl acrylate (HDCMEA) monomer was prepared as follows. Into a 1 liter flask were charged 30.3 grams (0.1 mole) of octadecanoyl chloride, 6.1 grams (0.1 mole) of ethanolamine, 10.1 grams (0.1 mole) of triethylamine, and several hundred ml of toluene. The mixture was allowed to react at room temperature overnight in order to form a slurry which contained

and triethylamine-HCl salt. Next, 9.05 grams (0.1 mole) of acryloyl chloride and 10.1 grams (0.1 mole) of triethylamine were added to the flask. The resulting slurry was allowed to react at room temperature for 2 hours after which the slurry was filtered in order to remove the triethylamine-HCl salt. The filtrate was vacuum stripped and recrystallized from methanol to yield 16.6 grams of HDCMEA.

A latex containing 5% solids was prepared from a 50:50 wt. ratio of HDCMEA and VAc monomer following the same procedure as described in Example 3. A dried polymer sample was prepared and evaluated via DSC as in Example 1. Melting points of 53° C. and 94° C. were obtained. A coating of the latex on a cellulose acetate film was dried at 105° C. for 2 minutes and evaluated according to the procedure of Example 1. Release and readhesion values are reported in Table I.

Example 8

ODEMAC/VAc (40:60)

Octadecyl N-ethyl methacrylate carbamate (ODEMAC) monomer was prepared according to the following procedure. Into a 500 ml flask containing a solution comprising 54 grams (0.2 mole) of octadecanol, 150 grams of toluene, and trace amounts of dibutyltin dilaurate catalyst, were charged 31 grams (0.2 mole) of isocyanatoethyl methacrylate. The mixture was heated to 50° C. for several hours and then allowed to react further at room temperature overnight. The solution was then vacuum stripped to yield 80 grams of ODEMAC monomer.

A latex containing 5% solids was prepared from a 40:60 wt. ratio of ODEMAC and VAc monomer following the same procedure as described in Example 3. A coating of the latex on a cellulose acetate film was dried at 80° C. for 2 minutes and evaluated according to the procedure of Example 1. Release and readhesion values are reported in Table I.

Example 9

ODCEA/VAc (50:50)

An ODCEA-VAc mixture of 50:50 wt ratio was prepared by forming ODCEA in situ. Into a 500 ml flask containing 41.2 grams of vinyl acetate were charged 29.6 grams (0.1 mole) of octadecyl isocyanate, 11.6 grams (0.1 mole) of hydroxyethyl acrylate, and trace amounts of dibutyltin dilaurate catalyst. The solution was allowed to react at 80° C. for several hours and then cooled to room temperature.

A latex of 5% solid was prepared from the above ODCEA-VAc 50:50 mixture following the same procedure as described in Example 3. A coating of the latex on a cellulose acetate film was dried at 80° C. for 2 minutes and evaluated according to the procedure of Example 1. Release and readhesion values are reported in Table I.

Example 10

ODCEA/MA/HEA (50:45:5)

A latex containing 5% solids was prepared from a 50:45:5 wt. ratio of ODCEA, MA, and HEA monomer following the same procedure as described in Example 3. A coating of the latex on a cellulose acetate film was dried at 80° C. for 2 minutes and evaluated according to the procedure of Example 1. Release and readhesion values are reported in Table I.

Example 11

ODCEA/MA/MAA (50:45:5)

A latex containing 5% solids was prepared from a 50:45:5 wt. ratio of ODCEA, MA, and methacrylic acid (MAA) monomer following the same procedure as described in Example 3. A coating of the latex on a cellulose acetate film was dried at 80° C. for 2 minutes and evaluated according to the procedure of Example 1. Release and readhesion values are reported in Table I.

Example 12

ODCEA/VAc (50:50)

A latex containing 23% solids was prepared from a 50:50 wt. ratio of ODCEA and VAc monomer as follows. A mixture of 10 grams of ODCEA and 10 grams of VAc was charged into a first 120 ml glass bottle. A solution comprising 1.2 grams of Avanel S-90 sodium alkyl polyether sulfonate emulsifier (35% active) and 60 grams of deionized water was charged into a second 120 ml glass bottle. Both bottles were heated in a water bath held at 70°-75° C. The contents from the two bottles were then mixed in a 250 ml container and homogenized using a Waring ™ blender set at a low speed for 2 minutes. The resulting emulsion was poured into a 120 ml glass bottle. Next, 0.1 gram of potassium persulfate and 0.1 gram of sodium bicarbonate were added to the emulsion. After purging with nitrogen, the bottle was sealed and tumbled in a water bath held at 75° C. for 15–20 hours.

A small portion of the latex was diluted with deionized water to 5% solids, coated on a cellulose acetate film, dried, and evaluated according to the procedure set forth in Example 1. Release and readhesion results are reported in Table I.

Example 13

ODCEA/VAc (50:50)

A latex containing 21% solids was prepared from a 50:50 wt. ratio of ODCEA and VAc monomer as follows. A mixture of 62.5 g of VAc was charged into a 480 ml glass bottle. A solution comprising 7.8g of Avanel S-90 emulsifier (35% active) and 375 grams of deionized water was charged into a second 480 ml glass bottle. Both bottles were heated in a water bath held at 70°-75° C. The contents from the two bottles were mixed in a 1-liter container and homogenized using a Waring TM blender set at a high speed for 2 minutes. The resulting emulsion was poured into a 480 ml glass bottle. Next, 0.625 gram of potassium persulfate and 0.625 gram of sodium bicarbonate were added to the emulsion. After purging with nitrogen, the bottle was sealed and tumbled in a water bath held at 75° C. for 15-20 hours.

A small portion of the latex was diluted with deionized water to 5% solids, coated on a cellulose acetate film, dried and evaluated according to the procedure set forth in Example 1. Release and readhesion values are reported in Table I.

The latex was then subjected to additional evaluation. Rolls of tape were constructed by coating the latex LAB on one side and a PSA on the other side of cellulose acetate film substrate. Some rolls of tape were tested for unwind from the roll and adhesion on a glass plate immediately, whereas other rolls of tape were aged in a 49° C. oven for 11 days and then tested for unwind and adhesion. Initial unwind values of 75-140 g/cm, initial adhesion values of 480-530 g/cm, aged unwind values of 110-210 g/cm, and aged adhesion values of 420-530 g/cm were obtained for the cellulose acetate tapes.

Control experiments using a standard solvent-based LAB (ODA-MA-AN-AA) provided initial unwind values of 75-140 g/cm, initial adhesion values of 420-480 g/cm, aged unwind values of 110-200 g/cm, and aged adhesion values of 410-500 g/cm for cellulose acetate tapes.

Example 14

ODCEA/VAc (50:50)

A latex containing 5% solids was prepared from a 50:50 wt. ratio of ODCEA and VAc monomer following the same procedure as described in Example 3 except that 0.08 g of Emphos CS-141 emulsifier (phosphate ester, available from Witco corp.) was used instead of 0.24 g of Avanel S-90 emulsifier. A coating of the latex on a cellulose acetate film was dried at 80° C. for 2 minutes and evaluated according to the procedure of Example 1. Release and readhesion results are reported in Table I.

Example 15

ODCEA/VAc (50:50)

A latex containing 5% solids was prepared from a 50:50 wt. ratio of ODCEA and VAc monomer following the same procedure as described in Example 3 except that 0.1 g of cetyltrimethyl ammonium bromide emulsifier was used instead of 0.24 g of Avanel S-90 emulsifier, and 0.1 g of V-50 [2,2'-Azobis(2-amidinopropane)dihydrochloride available from Wako Pure Chem. Ind. Inc.] was used instead of 0.1 g of potassium persulfate and 0.1 g of sodium bicarbonate. A coating of the latex on a cellulose acetate film was dried at 80° C. for 2 minutes and evaluated according to the procedure of Example 1. Release and readhesion results are reported in Table I.

Examples 16-18

A polyvinyl acetate (PVAc) latex was prepared as follows. Into a 120 ml glass bottle were charged 20 grams of VAc, 1.2 grams of Avanel S-90 (35% active) emulsifier, 60 grams of deionized water, 0.1 gram of potassium persulfate, and 0.1 gram of sodium bicarbonate. After purging with nitrogen, the bottle was sealed and tumbled in a 75° C. water bath for 15 hours. This resulted in a stable latex of 25% solids.

The PVAc latex was then diluted to 5% solids with deionized water and blended with the 5% ODCEA-VAc latex prepared according to Example 13 in the following ratios: 9:91 (Example 16), 17:83 (Example 17), and 50:50 (Example 18). The latex blends were coated on cellulose acetate films, dried, and evaluated according to the procedure set forth in Example 1. As shown in Table II, initial release values ranging from 27 to 47 g/cm and aged release values ranging from 100 to 130 g/cm were obtained for the blends compared to values of 380 g/cm and 530 g/cm, respectively, for a control coating (PVAc latex alone).

Examples 19-23

Three separate solutions containing 5% solids of the following polymers were prepared by dissolving the following polymer powders in deionized water: polyacrylic acid (PAA, Mw - 450,000, Polysciences Inc.) (Example 19), polyvinylpyrrolidone (PVP, K-90, GAF Corp.) (Examples 20 and 22), and hydroxyethyl cellulose (HEC, Cellosize WP-09H, Union Carbide Corp.) (Examples 21 and 23). Each polymer solution was then blended with a 5% ODCEA-VAc latex prepared according to Example 13 in the ratios of 9:91 (Examples 19-21) and 17:83 (Examples 22-23). The PAA-latex blend was neutralized with ammonia prior to coating on cellulose acetate film. The other blends were coated as is on cellulose acetate films. The coated films were dried and evaluated according to the procedure set forth in Example 1. As shown in Table III, initial release values ranging from 24 to 32 g/cm and aged release values ranging from 63 to 120 g/cm were obtained from the coatings against #810 Magic TM tape. All the coatings showed improved ink-receptivity for water-based pens compared to the coating from ODCEA-VAc latex without added water-soluble polymer.

While this invention has been described in connection with specific embodiments, it should be understood that it is capable of further modification. The claims herein are intended to cover those variations which one skilled in the art would recognize as the chemical equivalent of what has been described here.

TABLE I

Release Properties of Latex Coated Cellulose Acetate Film Against Magic ™ Tape

| Example # | Monomer Composition (wt) | % Solid of Latex Made | Initial* Release | Initial* Readhesion | Aged+ Release | Aged+ Readhesion |
|---|---|---|---|---|---|---|
| 1 | ODEA-VAc 60–40 | 5 | 38 | 300 | 95 | 300 |
| 2 | ODCEA-VAc 50–50 | 5 | 30 | 360 | 62 | 360 |
| 3 | ODCEA-VAc 50–50 | 5 | 29 | 330 | 68 | 320 |
| 4 | ODCEA-MA 50–50 | 5 | 41 | 440 | 64 | 260 |
| Comp. 1 | ODA-VAc 50–50 | 5 | 27 | 350 | 150 | 290 |
| Comp. 2 | ODA-MA 50–50 | 5 | 54 | 320 | 200 | 290 |
| Comp. 3 | ODA-MA-AN-AA 51-11-25-13 | 5 | 77 | 330 | 210 | 260 |
| 5 | HDCEA-VAc 50–50 | 5 | 21 | 320 | 79 | 290 |
| 6 | ODCEA-HDECA-VAc 40-10-50 | 5 | 24 | 300 | 29 | 290 |
| 7 | HDCMEA-VAc 50–50 | 5 | 26 | 240 | 91 | 330 |
| 8 | ODEMAC-VAc 40–60 | 5 | 11 | 330 | 110 | 320 |
| 9 | ODCEA-VAc 50–50 | 5 | 38 | 330 | 59 | 300 |
| 10 | ODCEA-MA-HEA 50-45-5 | 5 | 18 | 360 | 56 | 240 |
| 11 | ODCEA-MA-MAA 50-45-5 | 5 | 33 | 360 | 95 | 290 |
| 12 | ODCEA-VAc 50–50 | 23 | 38 | 330 | 72 | 330 |
| 13 | ODCEA-VAc 50–50 | 21 | 27 | 300 | 53 | 320 |
| 14 | ODCEA-VAc 50–50 | 5 | 20 | 380 | 47 | 300 |
| 15 | ODCEA-VAc 50–50 | 5 | 27 | 360 | 54 | 320 |

*Release and Readhesion values in g/cm.
+ Aged at 50° C. for 17 hours.

TABLE II

Release Properties of Latex Blend Coated Cellulose Acetate Film Against Magic ™ Tape

| Example # | PVAc: ODCEA-VAc | Initial* Release | Initial* Readhesion | Aged+ Release | Aged+ Readhesion |
|---|---|---|---|---|---|
| 16 | 9:91 | 27 | 440 | 110 | 320 |
| 17 | 17:83 | 39 | 420 | 100 | 380 |
| 18 | 50:50 | 47 | 440 | 130 | 360 |
| Control | 100:0 | 380 | 320 | 530 | 320 |

TABLE III

Release Properties of ODCEA-VAc Latex With Added Water-Soluble Polymer Coated On Cellulose Acetate Film Against Magic ™ Tape

| Example # | Polymer Type | Ratio of Polymer to ODCEA-VAc | Initial* Release | Initial* Readhesion | Aged+ Release | Aged+ Readhesion |
|---|---|---|---|---|---|---|
| 19 | PAA | 9:91 | 30 | 360 | 74 | 360 |
| 20 | PVP | 9:91 | 30 | 440 | 88 | 380 |
| 21 | HEC | 9:91 | 32 | 450 | 63 | 390 |
| 22 | PVP | 17:83 | 30 | 420 | 120 | 380 |
| 23 | HEC | 17:83 | 24 | 450 | 85 | 380 |

What is claimed is:

1. A method of preparing a coated sheet material comprising the steps of:
   a) forming a mixture comprising the following:
      (1) about 5 to about 70 weight percent of a melted free radically polymerizable free radically polymerizable long-chain monomer of the formula

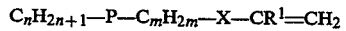

$$C_nH_{2n+1}-P-C_mH_{2m}-X-CR^1=CH_2$$

wherein
n is an integer of about 12 to about 20;
Y is a divalent polar linking group selected from the group consisting of

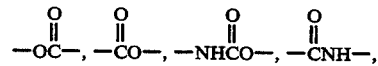
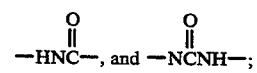

X is a divalent linking group selected from the group consisting of

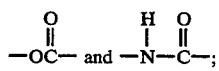

m is an integer of about 2 to about 10; and $R^1$ is selected from the group consisting of —H and —$CH_3$;

(2) about 30 to about 95 weight percent of deionized water; and (3) about 0.05 to about 4 weight percent of an emulsifier;

b) homogenizing the mixture in order to form an emulsion;

c) adding to said emulsion about 0.01 to about 1 weight percent of a free radical initiator capable of initiating free radical polymerization of said monomer upon being subjected to a means of initiation;

d) initiating free-radical polymerization by subjecting said emulsion to a means of initiation while agitating said emulsion under inert atmospheric conditions;

e) sustaining said free-radical polymerization until a polymer-containing latex is produced;

f) diluting said latex to at least about 2 weight percent solids by combining said latex with an aqueous phase;

g) coating said diluted latex onto at least a portion of one major surface of a flexible sheet; and h) evaporating said aqueous phase in order to form a coated sheet material comprising said flexible sheet coated with said polymer.

2. The coated sheet material formed according to the method of claim 1.

3. The sheet material of claim 2 wherein the latex coating is on one side of the sheet and an adhesive is on the other side.

4. The sheet material of claim 3, wherein the adhesive is a normally tacky and pressure-sensitive adhesive.

5. A stack of superimposed sheets of the material of claim 4, the pressure-sensitive adhesive on each sheet being in contact with the latex coating on an immediately adjacent sheet.

6. The sheet material of claim 3 wound convolutely on itself about a core to form a roll.

7. The sheet material of claim 2 wherein the latex coating covers a first portion of one side and a normally tacky and pressure-sensitive adhesive covers a second portion of the same side.

* * * * *

UNITED STATES PATENT AND TRADEMARK OFFICE
CERTIFICATE OF CORRECTION

PATENT NO.: 5,350,631

DATED: September 27, 1994

INVENTOR(S): Chi-Ming Tseng and Steven S. Kantner

It is certified that error appears in the above-identified patent and that said Letters Patent is hereby corrected as shown below:

Col. 2, line 6, "a cylated" should be --acylated--.

Col. 6, line 47, "P" should be --Y--.

Col. 6, line 51, "$C_nH_{2n+1}$" should be -- $C_nH_{2n+1}$- --.

Col. 16, line 47, "ODA/MA/NA/AA" should be --ODA/MA/AN/AA--.

Col. 22, line 42, "$C_nH_{2n+1}$-P-$C_mH_{2m}$-X-$CR^1$=$CH_2$" should be

--$C_nH_{2n+1}$-Y-$C_mH_{2m}$-X-$CR^1$=$CH_2$--.

Col. 22, line 67, "$-N\overset{\overset{O}{\|}}{C}NH-$;" should be -- $-HN\overset{\overset{O}{\|}}{C}NH-$; --

Signed and Sealed this

Eighteenth Day of June, 1996

Attest:

BRUCE LEHMAN

Attesting Officer     Commissioner of Patents and Trademarks